(12) United States Patent
Lee et al.

(10) Patent No.: US 11,620,941 B2
(45) Date of Patent: Apr. 4, 2023

(54) DC-DC CONVERTER, METHOD OF DC-DC CONVERTING USING THE SAME AND DISPLAY APPARATUS HAVING THE SAME

(71) Applicant: Samsung Display Co., Ltd., Yongin-Si (KR)

(72) Inventors: Yoon Young Lee, Asan-si (KR); Sung Chun Park, Suwon-si (KR); Chang Seok Chae, Seongnam-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 91 days.

(21) Appl. No.: 17/012,755

(22) Filed: Sep. 4, 2020

(65) Prior Publication Data

US 2021/0074205 A1    Mar. 11, 2021

(30) Foreign Application Priority Data

Sep. 6, 2019   (KR) .......................... 10-2019-0110926

(51) Int. Cl.
*G09G 3/3208*    (2016.01)
*H02M 3/158*     (2006.01)
*H02M 1/084*     (2006.01)

(52) U.S. Cl.
CPC .......... *G09G 3/3208* (2013.01); *H02M 1/084* (2013.01); *H02M 3/1582* (2013.01);
(Continued)

(58) Field of Classification Search
CPC ...... G09G 3/3208; G09G 3/3225; G09G 3/20; G09G 2330/028; G09G 2330/04; H02M 1/084; H02M 1/32; H02M 1/325; H02M 3/1582; H02M 3/1584; H02M 3/157; H02M 3/156
See application file for complete search history.

(56) References Cited

U.S. PATENT DOCUMENTS

2012/0127213 A1*  5/2012  Park ....................... H05B 45/50
                                                        345/212
2012/0293562 A1* 11/2012  Park ...................... G09G 3/3233
                                                        345/212
(Continued)

FOREIGN PATENT DOCUMENTS

KR    10-2013-0101814 A    9/2013
KR    10-1816256 B1         1/2018
(Continued)

*Primary Examiner* — David Tung
(74) *Attorney, Agent, or Firm* — Innovation Counsel LLP

(57) ABSTRACT

A DC-DC includes a sensor, a determiner, a reference voltage controller and an output voltage controller. The sensor is configured to sense an output voltage to generate a sensed signal. The determiner is electrically connected to the sensor and is configured to determine a difference between the sensed signal and a first protection level for generating a determiner output. The reference voltage controller is electrically connected to the determiner and is configured to generate a second reference voltage based on a first reference voltage and a value of the determiner output. The output voltage controller is electrically connected to the sensor and is configured to output the output voltage based on an input voltage, a feedback voltage of the output voltage, and the second reference voltage.

20 Claims, 11 Drawing Sheets

(52) U.S. Cl.
CPC .... *H02M 3/1584* (2013.01); *G09G 2330/028* (2013.01); *G09G 2330/04* (2013.01)

(56) References Cited

U.S. PATENT DOCUMENTS

| | | | | |
|---|---|---|---|---|
| 2013/0113773 A1* | 5/2013 | Lee | ............ | H05B 45/3725 |
| | | | | 315/119 |
| 2015/0214827 A1* | 7/2015 | Yoon | ............ | H02M 1/14 |
| | | | | 323/286 |
| 2016/0049872 A1* | 2/2016 | Park | ............ | H02M 3/158 |
| | | | | 345/212 |
| 2016/0125791 A1* | 5/2016 | Park | ............ | H02M 3/1584 |
| | | | | 345/76 |
| 2017/0250605 A1* | 8/2017 | Park | ............ | G09G 3/3266 |

FOREIGN PATENT DOCUMENTS

| | | | |
|---|---|---|---|
| KR | 10-1961116 B1 | 3/2019 | |
| KR | 10-1962900 B1 | 3/2019 | |

\* cited by examiner

DC-DC CONVERTER, METHOD OF DC-DC CONVERTING USING THE SAME AND DISPLAY APPARATUS HAVING THE SAME

CROSS-REFERENCE TO RELATED APPLICATION

This application claims priority under 35 U.S.C. § 119 to Korean Patent Application No. 10-2019-0110926, filed on Sep. 6, 2019 in the Korean Intellectual Property Office KIPO; the contents of the Korean Patent Application are incorporated by reference.

BACKGROUND

1. Technical Field

The technical field may relate to a DC-DC converter, a method of DC-DC converting using the DC-DC converter and a display apparatus including the DC-DC converter.

2. Description of the Related Art

A display apparatus may include a DC-DC converter to convert a battery voltage to a DC voltage suitable for a display panel of the display apparatus. When a load of an output voltage of the DC-DC converter increases sharply due to a short circuit or damage in a related circuit, the DC-DC converter may be shut down to protect the DC-DC converter.

An unexpected and/or undesirable shutdown of the DC-DC converter may cause an unexpectedly and/or undesirable shutdown of the display panel. The unexpected and/or undesirable shutdown of the display panel may lead to an undesirable situation, which may be a dangerous situation if the display panel/apparatus is part of, for example, an automotive apparatus.

SUMMARY

Example embodiments may be related to a DC-DC converter stably outputting an output voltage by changing a level of the output voltage without blocking the output voltage when the output voltage is abnormal.

Example embodiments may be related to a method of DC-DC converting using the DC-DC converter.

Example embodiments may be related to a display apparatus including the DC-DC converter.

In an example embodiment, a DC-DC converter includes a sensor, a determiner, a reference voltage controller and an output voltage controller. The sensor is configured to sense an output voltage to generate a sensed signal. The determiner is configured to determine a difference between the sensed signal and a first protection level. The reference voltage controller is configured to generate a second reference voltage based on a first reference voltage and an output value of the determiner. The output voltage controller is configured to output the output voltage based on an input voltage, a feedback voltage of the output voltage and the second reference voltage.

In an example embodiment, if time duration when the sensed signal is equal to or greater than the first protection level exceeds a first time duration, a protection status may be activated.

In an example embodiment, when the protection status is activated, the reference voltage controller may be configured to generate the second reference voltage such that the sensed signal is equal to or less than the first protection level.

In an example embodiment, if time duration when the sensed signal is equal to or less than the second protection level exceeds the first time duration in the protection status, the protection status may be deactivated.

In an example embodiment, if the protection status maintains equal to or longer than a second time duration, a level of the output voltage may be changed to a predetermined forced level and the protection status may be deactivated.

In an example embodiment, the determiner may be an amplifier configured to amplify a difference between the sensed signal and the first protection level to generate an amplified signal and output the amplified signal to the reference voltage controller.

In an example embodiment, the DC-DC converter may further include a comparator configured to compare the sensed signal to the first protection level representing an activation of the protection status or a second protection level representing a deactivation of the protection status to generate a comparison signal and a counter configured to accumulate the comparison signal to generate a protection activation signal.

In an example embodiment, the DC-DC converter may further include a selector configured to output one of the first protection level and the second protection level to the comparator.

In an example embodiment, the first protection level may be greater than the second protection level.

In an example embodiment, the determiner may be a first comparator configured to compare the sensed signal to the first protection level to generate a first comparison signal.

In an example embodiment, the DC-DC converter may further include a second comparator configured to compare the sensed signal to the first protection level representing an activation of the protection status or a second protection level representing a deactivation of the protection status to generate a second comparison signal and a counter configured to accumulate the second comparison signal to generate a protection activation signal.

In an example embodiment, the DC-DC converter may further include an updown counter configured to generate an increase-or-decrease signal based on the first comparison signal and the protection activation signal and output the increase-or-decrease signal to the reference voltage controller. The reference voltage controller may be configured to generate the second reference voltage based on the first reference voltage, the increase-or-decrease signal and the protection activation signal.

In an example embodiment, a method of DC-DC converting includes sensing an output voltage to generate a sensed signal, determining a difference between the sensed signal and a first protection level, generating a second reference voltage based on a first reference voltage and a determined result of the determiner and outputting the output voltage based on an input voltage, a feedback voltage of the output voltage and the second reference voltage.

In an example embodiment, if time duration when the sensed signal is equal to or greater than the first protection level exceeds a first time duration, a protection status may be activated.

In an example embodiment, when the protection status is activated, the second reference voltage may be generated such that the sensed signal is equal to or less than the first protection level.

In an example embodiment, if time duration when the sensed signal is equal to or less than the second protection level exceeds the first time duration in the protection status, the protection status may be deactivated.

In an example embodiment, if the protection status maintains equal to or longer than a second time duration, a level of the output voltage may be changed to a predetermined forced level and the protection status may be deactivated.

In an example embodiment, a display apparatus includes a display panel, a scan driver, a data driver and a power generator. The display panel includes a plurality of scan lines, a plurality of data lines and a plurality of pixels connected to the scan lines and the data lines. The scan driver is configured to output scan signals to the scan lines. The data driver is configured to output data voltages to the data lines. The power generator includes a DC-DC converter configured to provide a first power voltage and a second power voltage less than the first power voltage to the display panel. The DC-DC converter includes a sensor, a determiner, a reference voltage controller and an output voltage controller. The sensor is configured to sense an output voltage to generate a sensed signal. The determiner is configured to determine a difference between the sensed signal and a first protection level. The reference voltage controller is configured to generate a second reference voltage based on a first reference voltage and an output value of the determiner. The output voltage controller is configured to output the output voltage based on an input voltage, a feedback voltage of the output voltage and the second reference voltage.

In an example embodiment, the output voltage may be the first power voltage. When a protection status is activated, the DC-DC converter may be configured to decrease a level of the first power voltage.

In an example embodiment, the output voltage may be the second power voltage. When a protection status is activated, the DC-DC converter may be configured to increase a level of the second power voltage.

An embodiment may be related to a DC-DC converter. The DC-DC converter may include a sensor, a determiner, a reference voltage controller, and an output voltage controller. The sensor may sense an output voltage to generate a sensed signal. The determiner may be electrically connected to the sensor and may determine a difference between the sensed signal and a first protection level for generating a determiner output. The reference voltage controller may be electrically connected to the determiner and may generate a second reference voltage based on a first reference voltage and a value of the determiner output. The output voltage controller may be electrically connected to the sensor and may output the output voltage based on an input voltage, a feedback voltage of the output voltage, and the second reference voltage.

If the sensed signal maintains equal to or greater than the first protection level for a time length that exceeds first predetermined time duration, a protection mode of the DC-DC converter may be activated.

When the protection mode is activated, the reference voltage controller may generate the second reference voltage such that the sensed signal is equal to or less than the first protection level.

If the sensed signal maintains equal to or less than the second protection level for a time period that exceeds the first predetermined time duration in the protection mode of the DC-DC converter, the protection mode of the DC-DC converter may be deactivated.

If the protection mode of the DC-DC converter maintains equal to or longer than second predetermined time duration, a level of the output voltage may be changed to a predetermined forced level, and the protection mode of the DC-DC converter may be deactivated.

The determiner may be an amplifier configured to amplify the difference between the sensed signal and the first protection level to generate an amplified signal and configured to output the amplified signal as the determiner output to the reference voltage controller.

The DC-DC converter may include a comparator and a counter. The comparator may be electrically connected to the sensor and may compare the sensed signal with the first protection level representing activation of the protection mode or a second protection level representing deactivation of the protection mode to generate a comparison signal. The counter may be electrically connected to the comparator and may accumulate one or more values corresponding to the comparison signal to generate a protection activation signal.

The DC-DC converter may include a selector electrically connected to the comparator and configured to output one of the first protection level and the second protection level to the comparator.

The first protection level may be greater than the second protection level.

The determiner may be a first comparator configured to compare the sensed signal with the first protection level to generate a first comparison signal.

The DC-DC converter may include a second comparator and a first counter. The second comparator may be electrically connected to the sensor and may compare the sensed signal with the first protection level representing activation of the protection mode or a second protection level representing deactivation of the protection mode to generate a second comparison signal. The first counter may be electrically connected to the second comparator and may accumulate one or more values corresponding to the second comparison signal to generate a protection activation signal.

The reference voltage controller may include an updown counter electrically connected to the first counter, configured to generate an increase-or-decrease signal based on the first comparison signal and the protection activation signal, and configured to output the increase-or-decrease signal to the reference voltage controller. The reference voltage controller may generate the second reference voltage based on the first reference voltage, the increase-or-decrease signal, and the protection activation signal.

An embodiment may be related to a method of DC-DC converting. The method may be performed using a DC-DC converter. The method may include the following steps: sensing, using a sensor of the DC-DC converter, an output voltage to generate a sensed signal; determining, using a determiner of the DC-DC converter electrically connected to the sensor of the DC-DC converter, a difference between the sensed signal and a first protection level for generating a determiner output; generating, using a reference voltage controller of the DC-DC converter electrically connected to the determiner of the DC-DC converter, a second reference voltage based on a first reference voltage and a value of the determiner output; and outputting, using an output voltage controller of the DC-DC converter electrically connected to the sensor of the DC-DC converter, the output voltage based on an input voltage, a feedback voltage of the output voltage, and the second reference voltage.

If the sensed signal maintains equal to or greater than the first protection level for a time length that exceeds first predetermined time duration, a protection mode of the DC-DC converter may be activated.

When the protection mode of the DC-DC converter is activated, the second reference voltage may be generated such that the sensed signal is equal to or less than the first protection level.

If the sensed signal maintains equal to or less than the second protection level for a time period that exceeds the first predetermined time duration in the protection mode of the DC-DC converter, the protection mode of the DC-DC converter may be deactivated.

If the protection mode maintains equal to or longer than a second predetermined time duration, a level of the output voltage may be changed to a predetermined forced level, and the protection mode of the DC-DC converter may be deactivated.

An embodiment may be related to a display device. The display apparatus may include the following elements: a display panel including scan lines, data lines, and pixels electrically connected to the scan lines and the data lines; a scan driver configured to output scan signals to the scan lines; a data driver configured to output data voltages to the data lines; and a power generator including a DC-DC converter and configured to provide a first power voltage and a second power voltage less than the first power voltage to the display panel. The DC-DC converter may include the following elements: a sensor configured to sense an output voltage to generate a sensed signal; a determiner electrically connected to the sensor and configured to determine a difference between the sensed signal and a first protection level for generating a determiner output; a reference voltage controller electrically connected to the determiner and configured to generate a second reference voltage based on a first reference voltage and a value of the determiner output; and an output voltage controller electrically connected to the sensor and configured to output the output voltage based on an input voltage, a feedback voltage of the output voltage, and the second reference voltage.

The output voltage may be the first power voltage. The DC-DC converter may decrease a level of the first power voltage when a protection mode of the DC-DC converter is activated.

The output voltage may be the second power voltage. The DC-DC converter may increase a level of the second power voltage when a protection mode of the DC-DC converter is activated.

According to embodiments, the DC-DC converter may change a level of an output voltage without blocking the output voltage in an abnormal state of the output voltage, so that the DC-DC converter may continuously and/or stably output the output voltage. If the display apparatus (including the DC-DC converter) is part of an automotive apparatus, when the output voltage is abnormal, the DC-DC converter may not shut down, and the display panel may continue to function, so that the safety of a user of the automotive apparatus may be maintained.

DETAILED DESCRIPTION

Figure 1:
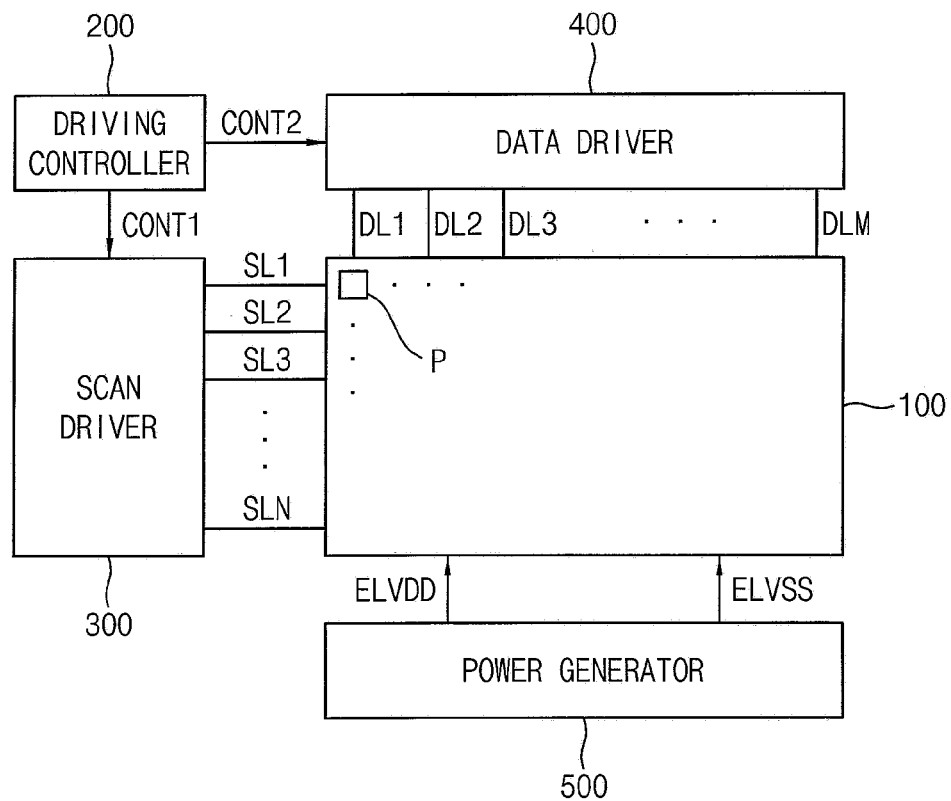
FIG. 1 is a block diagram illustrating a display apparatus according to an example embodiment.

Example embodiments are described with reference to the accompanying drawings. Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively. The term "connect" may mean "electrically connect." The term "insulate" may mean "electrically insulate" or "electrically isolate." The term "protection status" may mean "protection mode." The term "normal status" may mean "normal mode." The term "forced max voltage status" may mean "forced max voltage mode." In the drawings, a line connecting two elements may represent an electrical circuit and/or one or more conductive lines electrically connecting the two elements.

FIG. 1 is a block diagram illustrating a display apparatus according to an example embodiment.

Referring to FIG. 1, the display apparatus includes a display panel 100, a driving controller 200, a scan driver 300, a data driver 400 and a power generator 500.

The driving controller 200, the scan driver 300, the data driver 400, and the power generator 500 may be included in an integrated circuit chip.

The scan driver 300 may be mounted on the display panel 100 or integrated on the display panel 100. The data driver 400 may be mounted on the display panel 100 or integrated on the display panel 100.

The display panel 100 may display an image. The display panel 100 includes scan lines SL1, SL2, SL3 to SLN, data lines DL1, DL2, DL3 to DLM, and pixels P connected to the scan lines SL1 to SLN and the data lines DL1 to DLM. For example, the pixels P may be disposed in a matrix form (e.g., an array).

The number of the scan lines may be N. The number of the data lines may be M. The numbers N and M are natural numbers. The number of pixels P may be N*M.

The display panel 100 is connected to the scan driver 300 through the scan lines SL1 to SLN. The display panel 100 is connected to the data driver 400 through the data lines DL1 to DLM.

The display panel 100 receives a first power voltage ELVDD and a second power voltage ELVSS from the power generator 500. The first power voltage ELVDD may be applied to first electrodes of organic light emitting elements of the pixels P. The second power voltage ELVSS may be applied to second electrodes of the organic light emitting elements of the pixels P.

The driving controller 200 generates a first control signal CONT1 for controlling a driving timing of the scan driver 300 and outputs the first control signal CONT1 to the scan driver 300. The driving controller 200 generates a second control signal CONT2 for controlling a driving timing of the data driver 400 and outputs the second control signal CONT2 to the data driver 400.

The scan driver 300 generates scan signals in response to the first control signal CONT1 received from the driving controller 200. The scan driver 300 may sequentially output the scan signals to the scan lines SL1 to SLN.

The data driver 400 generates data signals in response to the second control signal CONT2 received from the driving controller 200. The data driver 400 outputs the data signals to the data lines DL1 to DLM.

The power generator 500 generates the first power voltage ELVDD and the second power voltage ELVSS. The power generator 500 provides the first power voltage ELVDD and the second power voltage ELVSS to the display panel 100.

The first power voltage ELVDD is applied to the first electrodes of the organic light emitting elements of the pixels P. The second power voltage ELVSS is applied to the second electrodes of the organic light emitting elements of the pixels P. The first power voltage ELVDD may be greater than the second power voltage ELVSS.

The power generator 500 may include a DC-DC converter to generate the first power voltage ELVDD and the second power voltage ELVSS.

Figure 2:
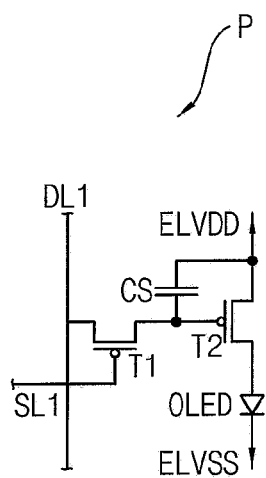
FIG. 2 is a circuit diagram illustrating a pixel structure of a display panel of FIG. 1 according to an example embodiment.

FIG. 2 is a circuit diagram illustrating a pixel structure of the display panel 100 of FIG. 1 according to an example embodiment.

Referring to FIGS. 1 and 2, the pixel P includes a first pixel switching element T1, a second pixel switching element T2, a storage capacitor CS, and an organic light emitting element OLED.

The first pixel switching element T1 may be a thin film transistor. The first pixel switching element T1 includes a control electrode connected to the scan line SL1, an input electrode connected to the data line DL1 and an output electrode connected to a control electrode of the second pixel switching element T2.

The control electrode of the first pixel switching element T1 may be a gate electrode. The input electrode of the first pixel switching element T1 may be a source electrode. The output electrode of the first pixel switching element T1 may be a drain electrode.

The second pixel switching element T2 includes a control electrode connected to the output electrode of the first pixel switching element T1, an input electrode to which the first power voltage ELVDD is applied and an output electrode connected to a first electrode of the organic light emitting element OLED.

The second pixel switching element T2 may be a thin film transistor. The control electrode of the second pixel switching element T2 may be a gate electrode. The input electrode of the second pixel switching element T2 may be a source electrode. The output electrode of the second pixel switching element T2 may be a drain electrode.

A first end of the storage capacitor CS is connected to the input electrode of the second pixel switching element T2. A second end of the storage capacitor CS is connected to the output electrode of the first pixel switching element T1.

The first electrode of the organic light emitting element OLED is connected to the output electrode of the second pixel switching element T2. The second power voltage ELVSS is applied to the second electrode of the organic light emitting element OLED.

The first electrode of the organic light emitting element OLED may be an anode electrode. The second electrode of the organic light emitting element OLED may be a cathode electrode.

The pixel P receives the scan signal, the data signal, the first power voltage ELVDD, and the second power voltage ELVSS and emits the organic light emitting element OLED in a luminance corresponding to the data signal to display a portion of an image displayed by the display panel 100.

Figure 3:
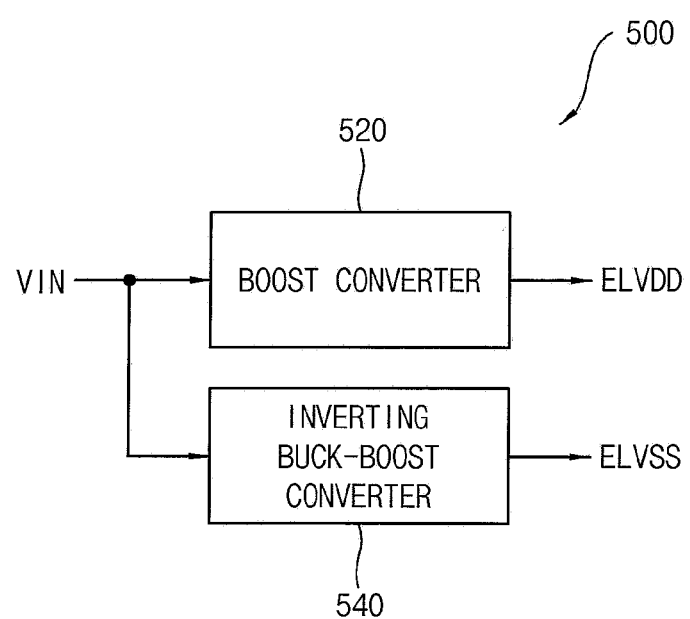
FIG. 3 is a block diagram illustrating a power generator of FIG. 1 according to an example embodiment.

FIG. 3 is a block diagram illustrating the power generator 500 of FIG. 1 according to an example embodiment.

Referring to FIGS. 1 to 3, the power generator 500 may include a first DC-DC converter 520 and a second DC-DC converter 540.

The first DC-DC converter 520 may generate the first power voltage ELVDD based on the input voltage VIN. The second DC-DC converter 540 may generate the second power voltage ELVSS based on the input voltage VIN.

The first DC-DC converter 520 may be a boost converter. The second DC-DC converter 540 may be an inverting buck-boost converter.

Figure 4A:
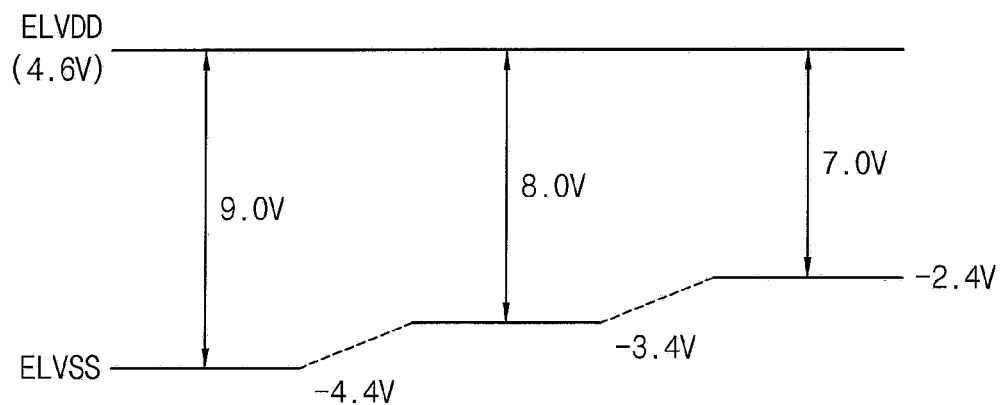
FIG. 4A is a conceptual diagram illustrating a level of a first power voltage and a level of a second power voltage of FIG. 3 in a protection status according to an example embodiment.

FIG. 4A is a conceptual diagram illustrating a level of the first power voltage ELVDD and a level of the second power voltage ELVSS of FIG. 3 in a protection status of the power generator 500 according to an example embodiment.

Referring to FIGS. 1 to 4A, when an output voltage of the first DC-DC converter 520 or an output voltage of the second DC-DC converter 540 is abnormal, the first DC-DC converter 520 or the second DC-DC converter 540 may not be turned off but may operate in the protection status of the power generator 500 in which a level of the output voltage of the first DC-DC converter 520 or the output voltage of the second DC-DC converter 540 is adjusted.

The output voltage of the first DC-DC converter 520 or the output voltage of the second DC-DC converter 540 is abnormal, a difference between the first power voltage ELVDD and the second power voltage ELVSS may decrease so that a current flowing through the display panel 100 may be decreased.

In FIG. 4A, when the output voltage of the second DC-DC converter 540 is abnormal, a level of the second power voltage ELVSS may be increased so that the current flowing through the display panel 100 may be decreased. The output voltage of the first DC-DC converter 520 may remain substantially unchanged.

Figure 4B:
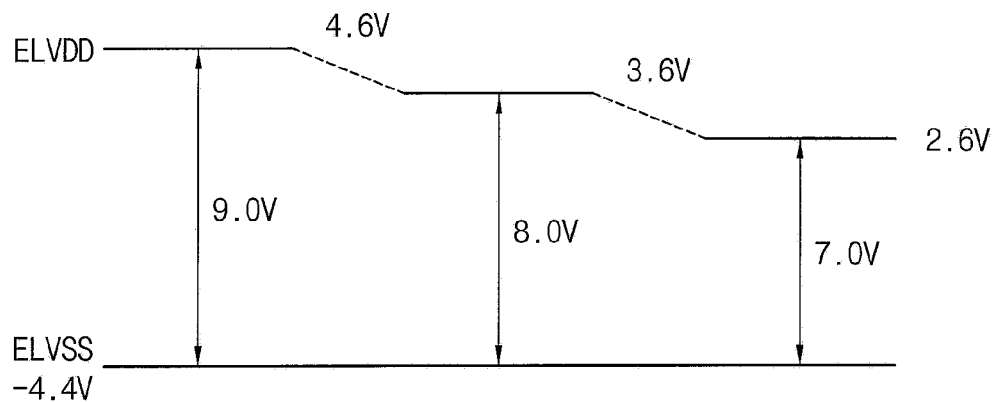
FIG. 4B is a conceptual diagram illustrating a level of a first power voltage and a level of a second power voltage of FIG. 3 in a protection status according to an example embodiment.

FIG. 4B is a conceptual diagram illustrating the level of the first power voltage ELVDD and the level of the second power voltage ELVSS of FIG. 3 in a protection status of the power generator 500 according to an example embodiment.

Referring to FIGS. 1 to 4B, when the output voltage of the first DC-DC converter 520 or the output voltage of the second DC-DC converter 540 is abnormal, the first DC-DC converter 520 or the second DC-DC converter 540 may not be turned off but may operate in the protection status of the power generator 500 in which a level of the output voltage of the first DC-DC converter 520 or the output voltage of the second DC-DC converter 540 is adjusted.

In FIG. 4B, when the output voltage of the first DC-DC converter 520 is abnormal, a level of the first power voltage ELVDD may be decreased so that the current flowing through the display panel 100 may be decreased. The output voltage of the second DC-DC converter 540 may remain substantially unchanged.

Figure 5:
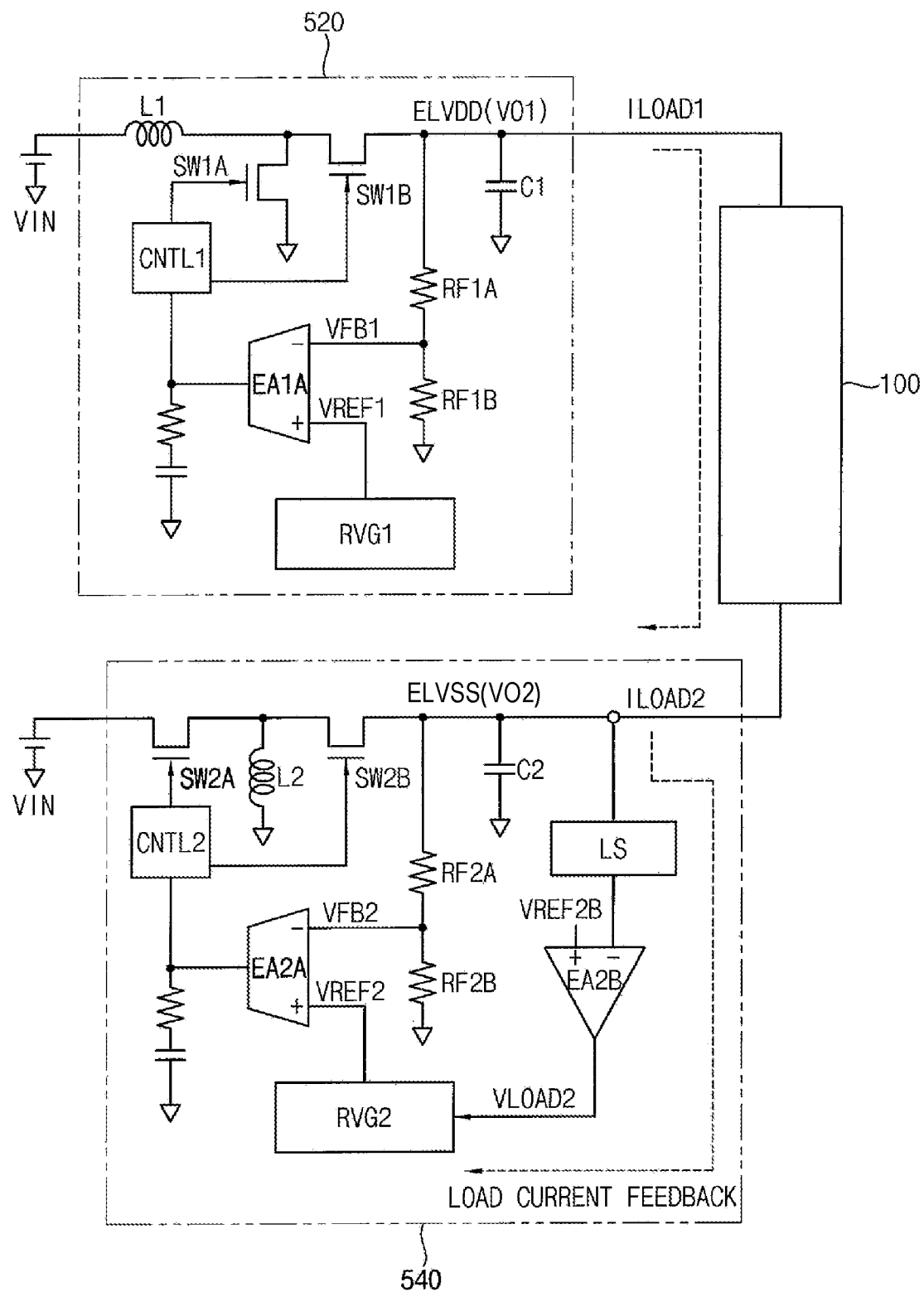
FIG. 5 is a circuit diagram illustrating a power generator of FIG. 1 according to an example embodiment.

FIG. 5 is a circuit diagram illustrating the power generator 500 of FIG. 1 according to an example embodiment.

Referring to FIGS. 1 to 5, the first DC-DC converter 520 may include a reference voltage generator RVG1 generating a reference voltage VREF1, an amplifier EA1A amplifying a difference between the reference voltage VREF1 and a feedback voltage VFB1 of the output voltage, an output voltage controller CNTL1 controlling the output voltage ELVDD(VO1) based on output of the amplifier EA1A. Switches SW1A and SW1B may operate based on one or more control signals provided by the output voltage controller CNTL1 to determine a level of the output voltage ELVDD(VO1). The first DC-DC converter 520 may further include an inductor L1 connected between a node/terminal where an input voltage is applied and each of the switches SW1A and SW1B, feedback resistors RF1A and RF1B for performing feedback of the output voltage ELVDD(VO1) in a voltage dividing method, and a capacitor C1 connected between a node/terminal where the output voltage ELVDD (VO1) is output and (voltage) ground. A current flowing through the node where the output voltage ELVDD(VO1) is output may be represented by the label ILOAD1 and/or the associated dashed line.

The second DC-DC converter 540 may include a reference voltage generator RVG2 generating a reference voltage VREF2, a first amplifier EA2A amplifying a difference between the reference voltage VREF2 and a feedback voltage VFB2 of the output voltage, an output voltage controller CNTL2 controlling the output voltage ELVSS(VO2) based on output of the first amplifier EA2A. Switches SW2A and SW2B may operate based on one or more control signals provided by the output voltage controller CNTL2 to determine a level of the output voltage ELVSS(VO2). The second DC-DC converter 540 may further include an inductor L2 connected between ground and node that is connected between the switches SW2A and SW2B, feedback resistors RF2A and RF2B for performing feedback of the output voltage ELVSS(VO2) in a voltage dividing method, and a capacitor C2 connected between a node/terminal where the output voltage ELVSS(VO2) is output and ground. A current flowing through the node where the output voltage ELVSS (VO2) is output may be represented by the label ILOAD2 and/or the associated dashed line.

Referring to FIG. 4A, when the output voltage of the second DC-DC converter 540 is abnormal, the level of the second power voltage ELVSS may be increased so that the current flowing through the display panel 100 may be decreased.

The second DC-DC converter 540 may further include a sensor LS sensing the output voltage ELVSS(VO2) and a second amplifier EA2B amplifying a difference between a sensed signal (sensed at the sensor LS) and a compensation reference voltage VREF2B.

Figure 6:
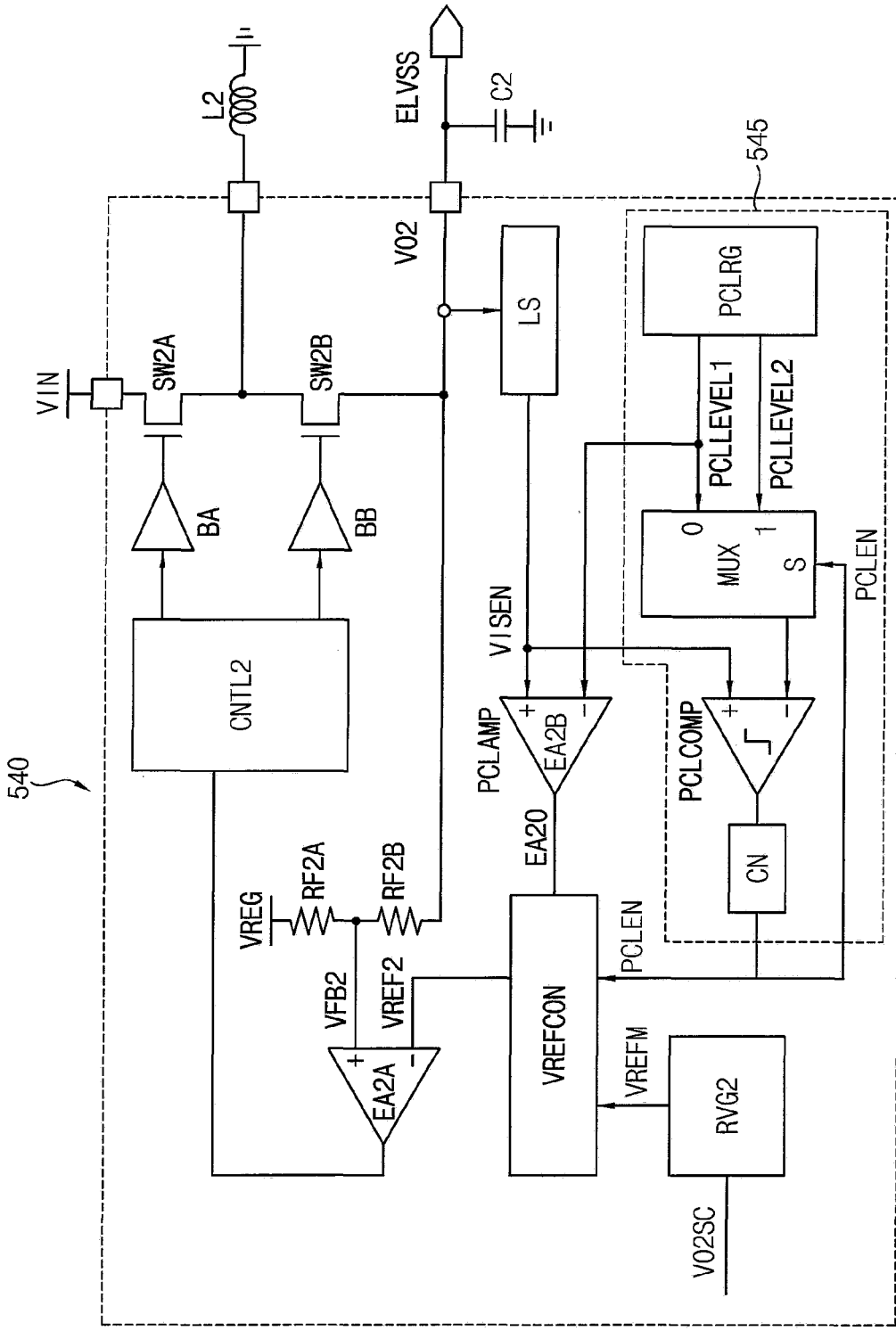
FIG. 6 is a circuit diagram illustrating a second DC-DC converter of FIG. 3 according to an example embodiment.

FIG. 6 is a circuit diagram illustrating the second DC-DC converter 540 of FIG. 3 according to an example embodiment.

Referring to FIGS. 1 to 6, when the output voltage of the second DC-DC converter 540 is abnormal, the second DC-DC converter 540 may operate in the protection status of the second DC-DC converter 540 and/or the protection status of the power generator 500. In the protection status, the level of the second power voltage ELVSS may be increased so that the current flowing through the display panel 100 may be decreased.

The second DC-DC converter 540 may include the sensor LS sensing the output voltage ELVSS to generate the sensed signal VISEN, a determiner EA2B (PCLAMP) determining a difference between the sensed signal VISEN and a first protection level PCLLEVEL1 for generating an output value EA2O, a reference voltage controller VREFCON generating a second reference voltage VREF2 based on a first reference voltage VREFM and the output value EA2O of the determiner EA2B (PCLAMP), and the output voltage controller CNTL2 (or output voltage controller CNTL2-BA-SW2A-BB-SW2B) outputting the output voltage ELVSS based on the input voltage VIN, the feedback voltage VFB2 and the second reference voltage VREF2.

The sensed signal VISEN may be generated by sensing a current ILOAD2 flowing through an output node of the second DC-DC converter 540 and by converting the sensed current ILOAD2 into a voltage level. Thus, the sensed signal VISEN may correspond to the output voltage ELVSS.

The determiner EA2B (PCLAMP) may be the second amplifier EA2B (PCLAMP) amplifying the difference between the sensed signal VISEN and the first protection level PCLLEVEL1 to generate an amplified signal EA2O and outputting the amplified signal EA2O to the reference voltage controller VREFCON.

The second DC-DC converter 540 may further include a comparator PCLCOMP comparing the sensed signal VISEN with the first protection level PCLLEVEL1 representing activation of the protection status or a second protection level PCLLEVEL2 representing deactivation of the protection status to generate a comparison signal. The second DC-DC converter 540 may further include a counter CN accumulating/adding one or more values corresponding to the comparison signal to generate a protection activation signal PCLEN. The first protection level PCLLEVEL1 may be greater than the second protection level PCLLEVEL2.

The counter CN may count a time when the sensed signal VISEN is equal to or greater than the first protection level PCLLEVEL1. The counter CN may count a time when the sensed signal VISEN is equal to or less than the second protection level PCLLEVEL2.

For example, when the protection status is activated, the protection activation signal PCLEN may have a value of one. In contrast, when the protection status is deactivated, the protection activation signal PCLEN may have a value of zero.

The second DC-DC converter 540 may further include a selector MUX outputting one of the first protection level PCLLEVEL1 and the second protection level PCLLEVEL2 to the comparator PCLCOMP. For example, when the protection status is in an activated status, the selector MUX may output the second protection level PCLLEVEL2 to the comparator PCLCOMP to monitor deactivation of the protection status. In contrast, when the protection status is in a deactivated status, the selector MUX may output the first protection level PCLLEVEL1 to the comparator PCLCOMP to monitor activation of the protection status. The selector MUX includes a first input terminal 0 receiving the first protection level PCLLEVEL1, a second input terminal 1 receiving the second protection level PCLLEVEL2 and a control input terminal S receiving the protection activation signal PCLEN from the counter CN.

The second DC-DC converter 540 may further include a protection level generator PCLRG generating the first protection level PCLLEVEL1 and the second protection level PCLLEVEL2.

The second DC-DC converter 540 and/or the output voltage controller CNTL2-BA-SW2A-BB-SW2B may include buffers BA and BB disposed between the output voltage controller CNTL2 and the switches SW2A and SW2B.

The second DC-DC converter 540 may further include a reference voltage generator RVG2 generating the first reference voltage VREFM. The first reference voltage VREFM may be determined by an output voltage setting code VO2SC.

Figure 7:
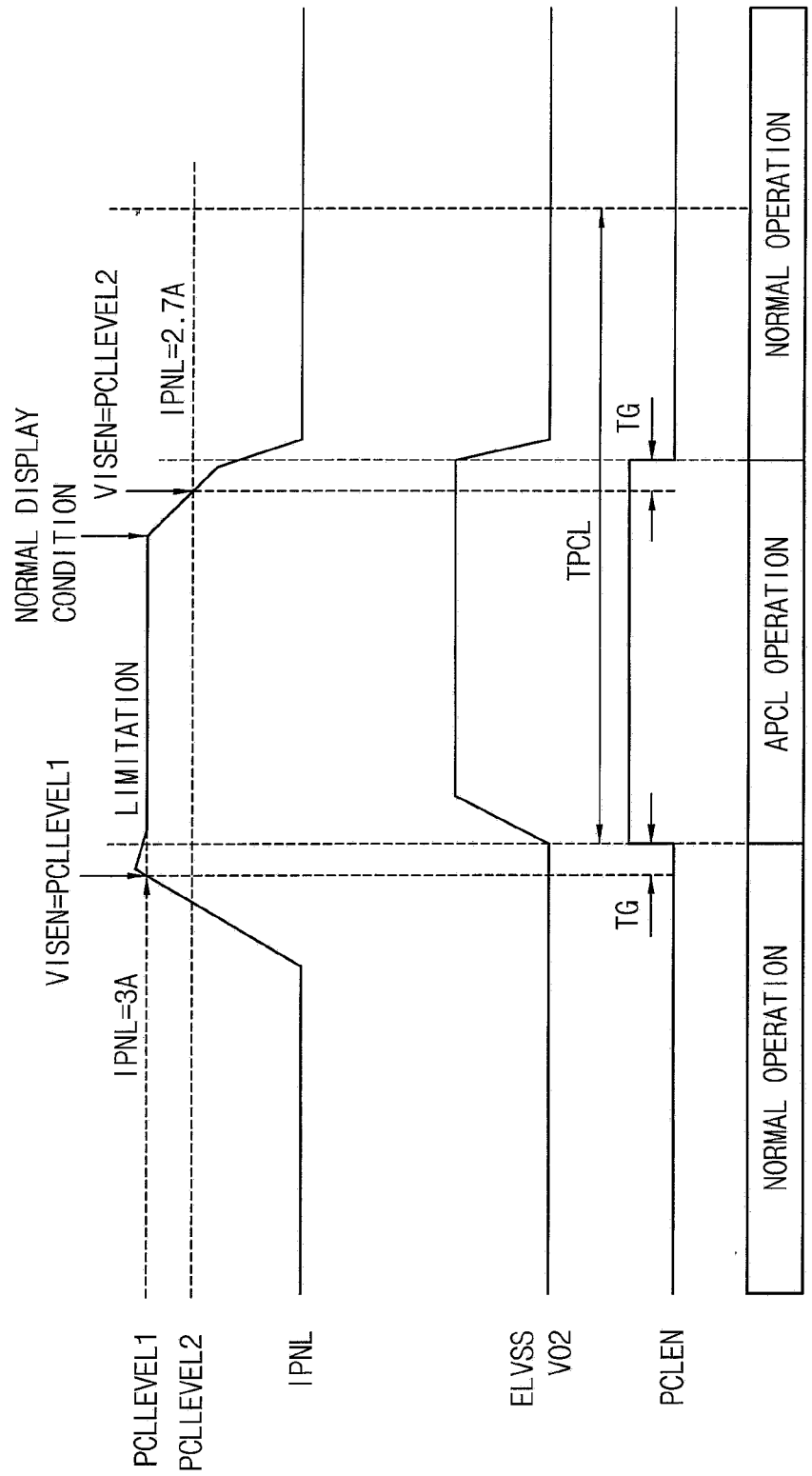
FIG. 7 is a timing diagram illustrating an operation of the second DC-DC converter of FIG. 6 according to an example embodiment.

FIG. 7 is a timing diagram illustrating an operation of the second DC-DC converter 540 of FIG. 6 according to an example embodiment.

Referring to FIGS. 1 to 7, when the sensed signal VISEN corresponding to the current IPNL (ILOAD2) flowing through the display panel 100 is less than the first protection level PCLLEVEL1, the output voltage ELVSS may have a normal status and the power generator 500 may normally operate (NORMAL OPERATION).

If time duration for which the sensed signal VISEN is equal to or greater than the first protection level PCLLEVEL1 exceeds first predetermined time duration TG, the second DC-DC converter 540 may operate in the protection status (APCL OPERATION).

During the protection status (APCL OPERATION) of the second DC-DC converter 540, the level of the output voltage ELVSS increases, and the sensed signal VISEN is controlled not to exceed the first protection level PCLLEVEL1.

In the protection status (APCL OPERATION), if time duration for which the sensed signal VISEN is equal to or less than the second protection level PCLLEVEL2 exceeds the first predetermined time duration TG, the second DC-DC converter 540 may normally operate (NORMAL OPERATION).

The first protection level PCLLEVEL1 to enter the protection status (APCL OPERATION) may be set to be greater than the second protection level PCLLEVEL2 to exit the protection status (APCL OPERATION) and enter a normal status (NORMAL OPERATION).

If the time duration for which the sensed signal VISEN is equal to or greater than the first protection level PCLLEVEL1 does not exceed the first predetermined time duration TG, the protection status (APCL OPERATION) does not start although the output voltage ELVSS temporally has a high value due to a noise or a glitch. If the time duration for which the sensed signal VISEN is equal to or less than the second protection level PCLLEVEL2 does not exceed the first predetermined time duration TG, the protection status (APCL OPERATION) continues although the output voltage ELVSS temporally has a low value due to a noise or a glitch.

Figure 8:
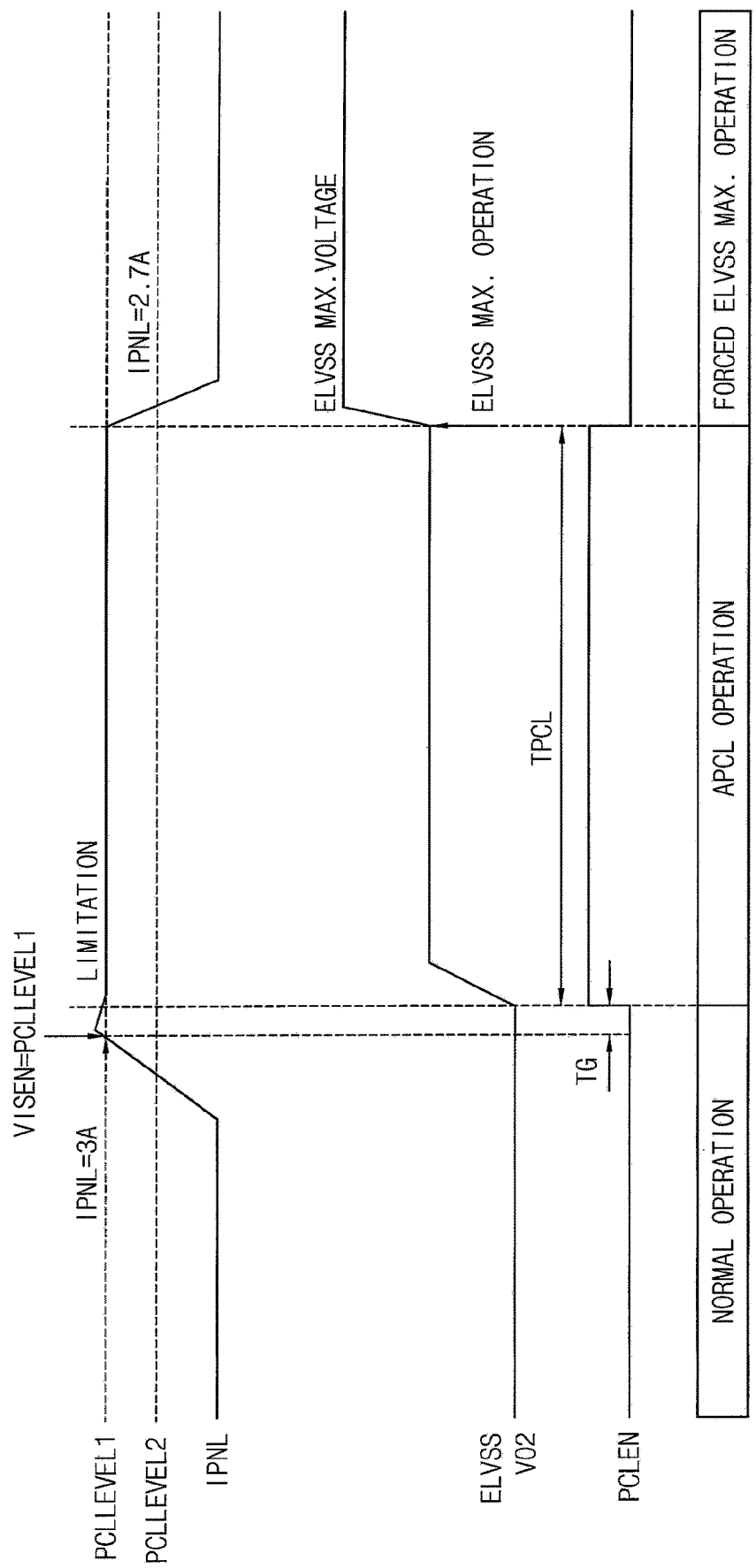
FIG. 8 is a timing diagram illustrating an operation of the second DC-DC converter of FIG. 6 according to an example embodiment.

FIG. 8 is a timing diagram illustrating an operation of the second DC-DC converter 540 of FIG. 6 according to an example embodiment.

Referring to FIGS. 1 to 8, if time duration for which the sensed signal VISEN is equal to or greater than the first protection level PCLLEVEL1 exceeds first predetermined time duration TG, the second DC-DC converter 540 may operate in the protection status (APCL OPERATION).

If the protection status (APCL OPERATION) maintains equal to or longer than second predetermined time duration TPCL, a level of the output voltage ELVSS may be changed to a predetermined forced level (ELVSS MAX. VOLTAGE), and the second DC-DC converter 540 may operate in a forced max voltage status (FORCED ELVSS MAX. OPERATION).

In FIG. 7, the protection status (APCL OPERATION) maintains for a relatively short time that is shorter than the second predetermined time duration TPCL, and the normal status (NORMAL OPERATION) is recovered soon. In FIG. 7, the protection status (APCL OPERATION) of the output voltage ELVSS may be a short-term (temporary) status.

In FIG. 8, the protection status (APCL OPERATION) of the output voltage ELVSS maintains longer than the second time duration TPCL, and the normal status (NORMAL OPERATION) is not naturally recovered. In FIG. 8, the protection status (APCL OPERATION) of the output voltage ELVSS may be a long-term (not temporary) status. When the protection status maintains for a long time, the output voltage ELVSS may be forced to a predetermined level so that a minimum current for displaying an image to a user may flow through the display panel 100, and the display panel 100 may not be turned off. The display panel 100 is not turned off, so that the user may be protected. The output voltage ELVSS in the forced maximum voltage status (FORCED ELVSS MAX. OPERATION) may be greater than the output voltage ELVSS in the protection status (APCL OPERATION).

Figure 9:
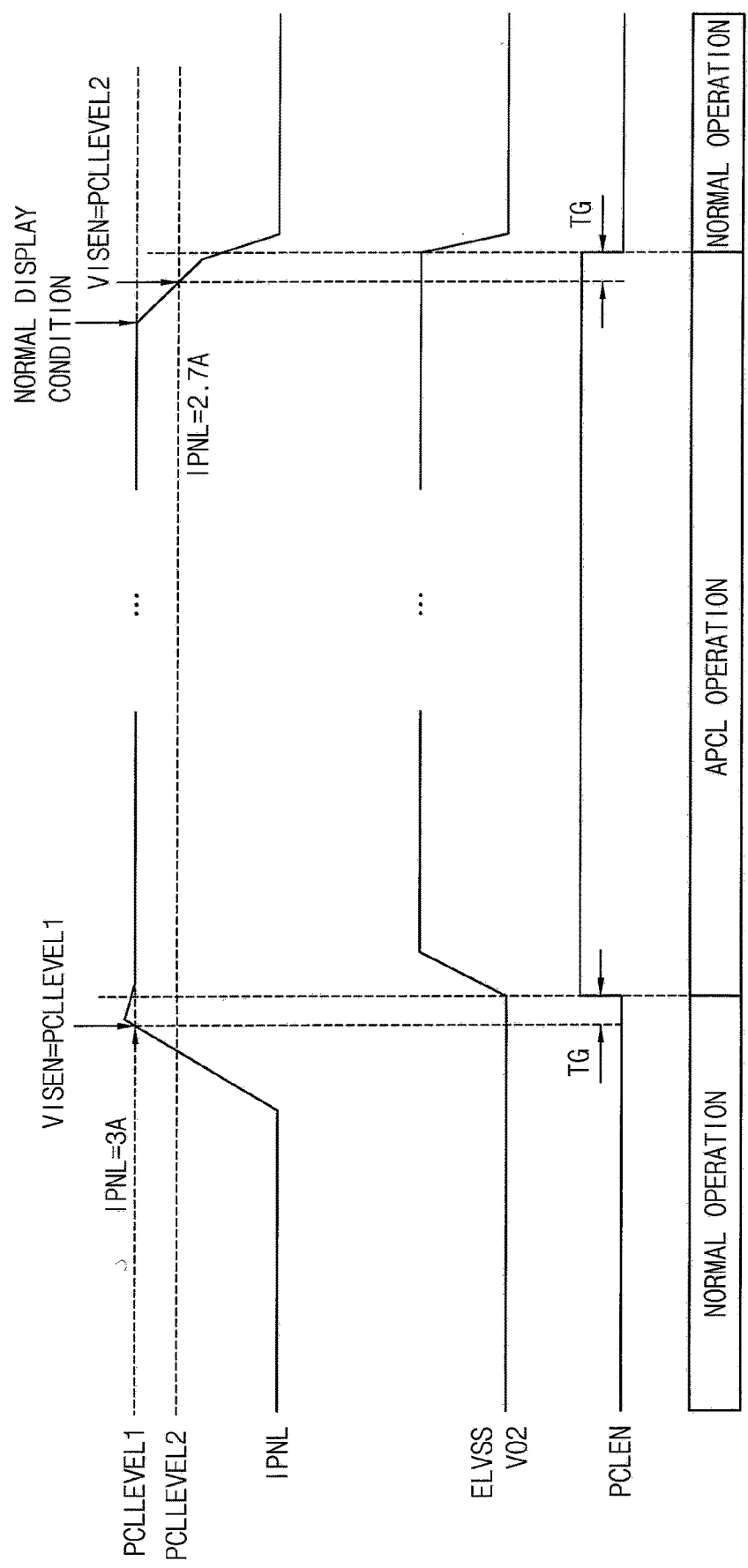
FIG. 9 is a timing diagram illustrating an operation of the second DC-DC converter of FIG. 6 according to an example embodiment.

FIG. 9 is a timing diagram illustrating an operation of the second DC-DC converter 540 of FIG. 6 according to an example embodiment.

Referring to FIGS. 1 to 9, if time duration for which the sensed signal VISEN is equal to or greater than the first protection level PCLLEVEL1 exceeds first predetermined time duration TG, the second DC-DC converter 540 may operate in the protection status (APCL OPERATION).

In FIG. 9, although the protection status (APCL OPERATION) of the output voltage ELVSS maintains for a long time, the second DC-DC converter 540 may not be operated in the forced maximum voltage status (FORCED ELVSS MAX. OPERATION), unlike FIG. 8.

In FIG. 9, although the protection status (APCL OPERATION) maintains for a long time, the second DC-DC converter 540 may wait for the normal status (NORMAL OPERATION) to be recovered.

As shown in FIGS. 8 and 9, the forced maximum voltage status (FORCED ELVSS MAX. OPERATION) may be optional.

Figure 10:
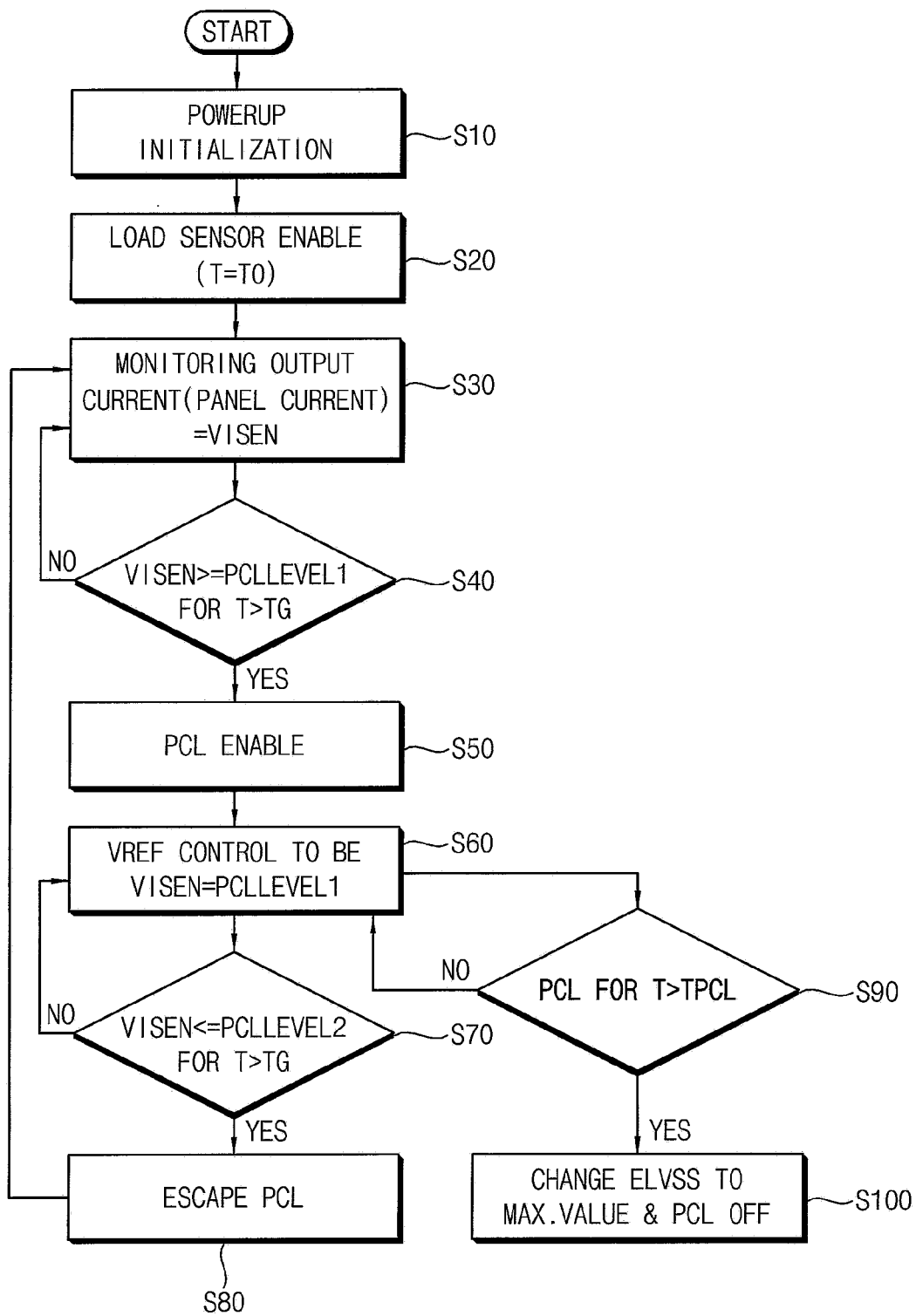
FIG. 10 is a flowchart illustrating an operation of the second DC-DC converter of FIG. 6 according to an example embodiment.

FIG. 10 is a flowchart illustrating an operation of the second DC-DC converter 540 of FIG. 6 according to an example embodiment.

Referring to FIGS. 1 to 10, the display apparatus is turned on and the display apparatus is initialized (step S10). The sensor (LOAD SENSOR) LS is enabled, wherein the monitored time duration T=T0 (step S20).

The sensor LS monitors the output current ILOAD2 to the display panel 100 (step S30). The sensor LS may generate the sensed signal VISEN based on the output current ILOAD2 to the display panel 100.

In the normal status (NORMAL OPERATION) of the second DC-DC converter 540, it is determined whether the monitored time duration T for which the sensed signal VISEN is equal to or greater than the first protection level PCLLEVEL1 exceeds the first predetermined time duration TG or not (step S40).

If the monitored time duration T for which the sensed signal VISEN is equal to or greater than the first protection level PCLLEVEL1 exceeds the first predetermined time duration TG, the protection status (APCL OPERATION) may be activated (step S50). When the protection status is activated, the protection activation signal PCLEN may have the value of one.

If the monitored time duration T for which the sensed signal VISEN is equal to or greater than the first protection level PCLLEVEL1 does not exceed the first predetermined time duration TG, the sensor LS continuously monitors the output current ILOAD2 to the display panel 100.

When the protection status (APCL OPERATION) is activated, the reference voltage controller VREFCON may generate the second reference voltage VREF2 such that the sensed signal VISEN is equal to or less than the first protection level PCLLEVEL1 (step S60).

In the protection status (APCL OPERATION) of the second DC-DC converter 540, the second DC-DC converter 540 may determine whether the monitored time duration T2 for which the sensed signal VISEN is equal to or less than the second protection level PCLLEVEL2 exceeds the first time duration TG or not (step S70).

If the monitored time duration T2 for which the sensed signal VISEN is equal to or less than the second protection level PCLLEVEL2 exceeds the first time duration TG, the protection status (APCL OPERATION) may be deactivated (step S80). When the protection status is deactivated, the protection activation signal PCLEN may have the value of zero. As shown in FIG. 10, the first time duration TG in the step S70 may be equal to the first time duration TG in the step S40. Alternatively, in an example embodiment, the first time duration TG in the step S70 may be set differently from the first time duration TG in the step S40.

When the protection status (APCL OPERATION) is deactivated, the second DC-DC converter resumes the normal status (NORMAL OPERATION), and the sensor LS continuously monitors the output current ILOAD2 to the display panel 100 (step S30).

The second DC-DC converter 540 may determine whether the protection status (APCL OPERATION) maintains for a time length T3 equal to or longer than a second time duration TPCL or not (step S90).

If the protection status (APCL OPERATION) maintains for a time length T3 equal to or longer than the second time duration TPCL, the level of the output voltage ELVSS may be changed to the predetermined forced level (ELVSS MAX. VOLTAGE), and the protection status (APCL OPERATION) may be deactivated (step S100).

According to embodiments, the DC-DC converter 520 and 540 may change the level of the output voltage ELVDD and ELVSS without blocking the output voltage ELVDD and ELVSS when one or more of the output voltage ELVDD and ELVSS is abnormal, so that the DC-DC converter 520 and 540 may stably output the output voltage ELVDD and ELVSS. Thus, the DC-DC converter 520 and 540 may not undesirably shut down, and the display panel 100 may continue to operate. If the display panel is part of an automotive apparatus, the safety of a user of the automotive apparatus may be protected.

Figure 11:
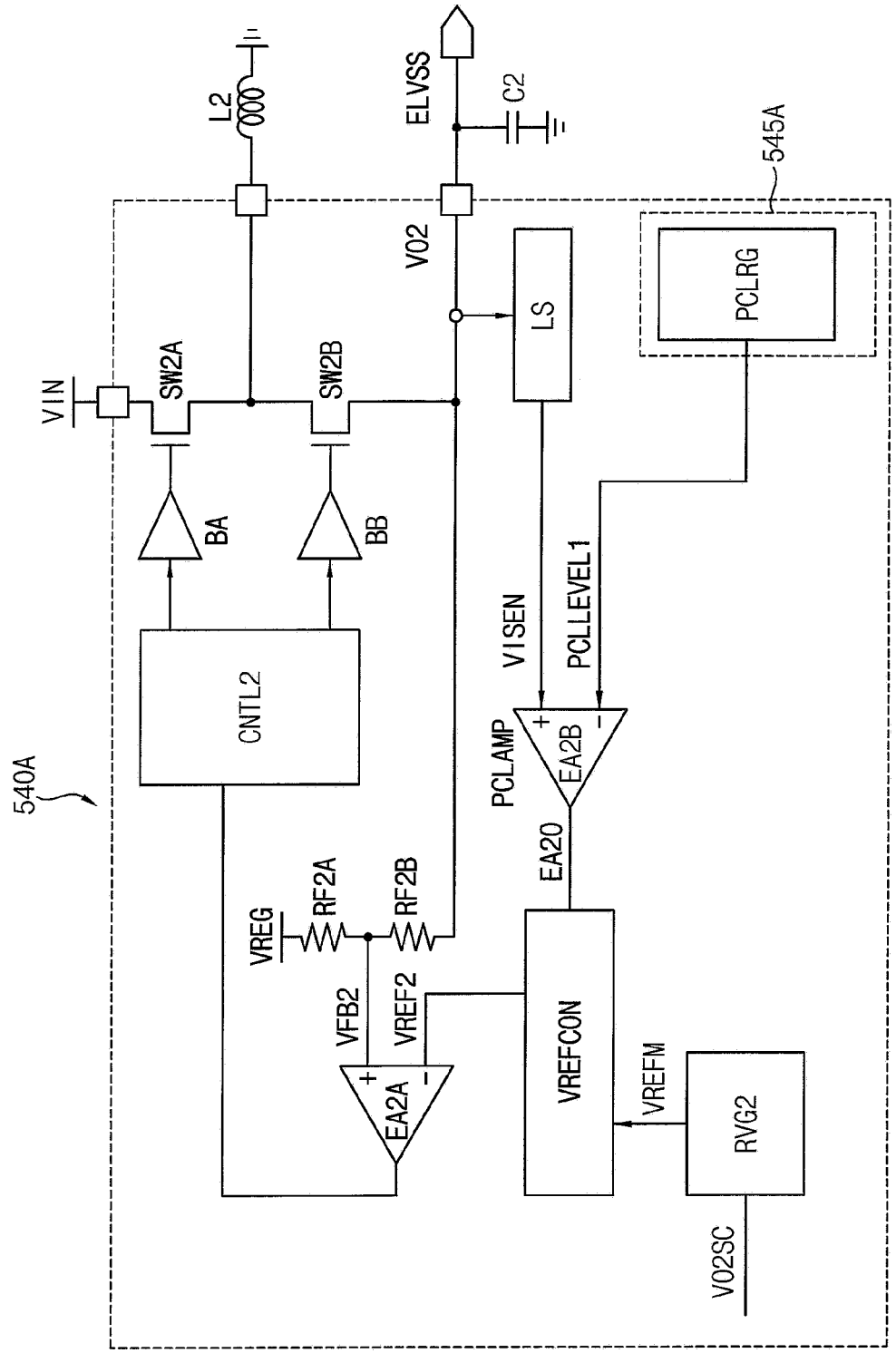
FIG. 11 is a circuit diagram illustrating a second DC-DC converter of a display apparatus according to an example embodiment.

FIG. 11 is a circuit diagram illustrating a second DC-DC converter 540A of a display apparatus according to an example embodiment.

Some features related to the DC-DC converter 540A, the method of DC-DC converting using the DC-DC converter 540A, and the display apparatus including the DC-DC converter 540A may be substantially the same as or analogous to some features related to the DC-DC converter 540, the method of DC-DC converting using the DC-DC converter 540, and the display apparatus including the DC-DC converter 540 described with reference to one or more of FIGS. 1 to 10.

Referring to one or more of FIGS. 1 to 11, the display apparatus includes a display panel 100, a driving controller 200, a scan driver 300, a data driver 400, and a power generator 500.

The power generator 500 the power generator 500 may include a first DC-DC converter 520 and a second DC-DC converter 540A (instead of 540).

The first DC-DC converter 520 may generate the first power voltage ELVDD based on the input voltage VIN. The second DC-DC converter 540A may generate the second power voltage ELVSS based on the input voltage VIN.

When an output voltage of the first DC-DC converter 520 or an output voltage of the second DC-DC converter 540A is abnormal, the first DC-DC converter 520 or the second DC-DC converter 540A may not be turned off but may operate in a protection status in which a level of the output voltage of the first DC-DC converter 520 or the output voltage of the second DC-DC converter 540A is adjusted.

The second DC-DC converter 540A may include the sensor LS sensing the output voltage ELVSS to generate the sensed signal VISEN, a determiner EA2B (PCLAMP) determining a difference between the sensed signal VISEN and a protection level PCLLEVEL1 to provide an output value EA2O, a reference voltage controller VREFCON generating a second reference voltage VREF2 based on a first reference voltage VREFM and the output value EA2O of the determiner EA2B (PCLAMP), and the output voltage controller CNTL2 (or output voltage controller CNTL2-BA-BB-SW2A-SW2B) outputting the output voltage ELVSS based on the input voltage VIN, the feedback voltage VFB2, and the second reference voltage VREF2.

The determiner EA2B (PCLAMP) may be the second amplifier EA2B (PCLAMP) amplifying the difference between the sensed signal VISEN and the protection level PCLLEVEL1 to generate an amplified signal EA2O and outputting the amplified signal EA2O to the reference voltage controller VREFCON.

The protection level PCLLEVEL1 representing activation of the protection status may be equal to the protection level PCLLEVEL1 representing deactivation of the protection status.

The second DC-DC converter 540A may further include a protection level generator PCLRG generating the protection level PCLLEVEL1.

When the sensed signal VISEN is equal to or greater than the protection level PCLLEVEL1, the protection status (APCL OPEATION) of the second DC-DC converter 540A immediately starts. In the protection status (APCL OPEATION), when the sensed signal VISEN is equal to or less than the protection level PCLLEVEL1, the protection status (APCL OPERATION) of the second DC-DC converter 540A immediately ends and the normal status (NORMAL OPERATION) immediately starts.

In an embodiment, the second DC-DC converter 540A may further include the comparator PCLCOMP and the counter CN shown in FIG. 6, so that a predetermined deglitch time length TG to enter the protection status (APCL OPERATION) and a predetermined deglitch time length TG to escape the protection status (APCL OPERATION) may be set.

According to embodiments, the DC-DC converters 520 and 540A may change the level of the output voltage ELVDD or ELVSS without blocking the output voltages ELVDD and ELVSS when the output voltage ELVDD or ELVSS is abnormal. Therefore, the DC-DC converters 520 and 540A may stably output the output voltages ELVDD and ELVSS. Thus, the DC-DC converters 520 and 540A may not be shut down, and the display panel 100 may continue to operate. If the display panel 100 is part of an automotive apparatus, the safety of a user of the automotive apparatus may be protected.

Figure 12:
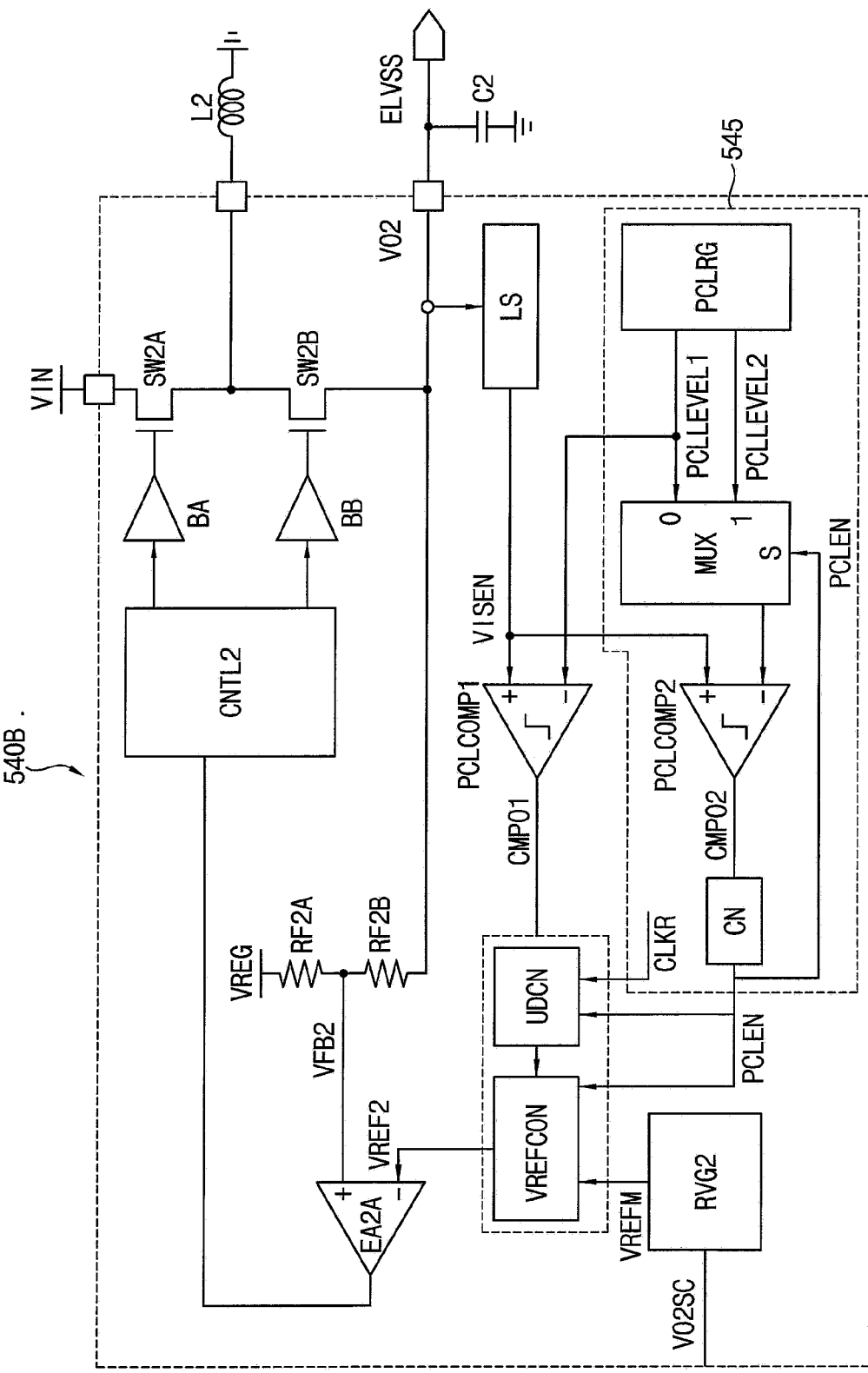
FIG. 12 is a circuit diagram illustrating a second DC-DC converter of a display apparatus according to an example embodiment.

FIG. 12 is a circuit diagram illustrating a second DC-DC converter 540B of a display apparatus according to an example embodiment.

Some features related to the DC-DC converter MOB, the method of DC-DC converting using the DC-DC converter MOB, and the display apparatus including the DC-DC converter MOB may be substantially the same as or analogous to some features related to the DC-DC converter 540/540A, the method of DC-DC converting using the DC-DC converter 540/540A, and the display apparatus including the DC-DC converter 540/540A described with reference to one or more of FIGS. 1 to 11.

Referring to one or more of FIGS. 1 to 12, the display apparatus includes a display panel 100, a driving controller 200, a scan driver 300, a data driver 400 and a power generator 500.

The power generator 500 the power generator 500 may include a first DC-DC converter 520 and a second DC-DC converter 540B (instead of 540 or 540A).

The first DC-DC converter 520 may generate the first power voltage ELVDD based on the input voltage VIN. The second DC-DC converter 540B may generate the second power voltage ELVSS based on the input voltage VIN.

When an output voltage of the first DC-DC converter 520 or an output voltage of the second DC-DC converter 540B is abnormal, the first DC-DC converter 520 or the second DC-DC converter 540B may not be turned off but may operate in a protection status in which a level of the output voltage of the first DC-DC converter 520 or the output voltage of the second DC-DC converter 540B is adjusted.

The second DC-DC converter 540B may include the sensor LS sensing the output voltage ELVSS to generate the sensed signal VISEN, a determiner PCLCOMP1 determining a difference between the sensed signal VISEN and a protection level PCLLEVEL1 to generate an output value CMPO1, a reference voltage controller VREFCON generating a second reference voltage VREF2 based on a first reference voltage VREFM and the output value CMPO1 of the determiner PCLCOMP1, and the output voltage controller CNTL2 (or output voltage controller CNTL2-BA-BB-SW2A-SW2B) outputting the output voltage ELVSS based on the input voltage VIN, the feedback voltage VFB2, and the second reference voltage VREF2.

The determiner PCLCOMP1 may be a first comparator PCLCOMP1 comparing the sensed signal VISEN with the first protection level PCLLEVEL1 to generate a first comparison signal CMPO1.

The second DC-DC converter MOB may further include a second comparator PCLCOMP2 comparing the sensed signal VISEN with the first protection level PCLLEVEL1 representing activation of the protection status or a second protection level PCLLEVEL2 representing deactivation of the protection status to generate a second comparison signal CMPO2. The second DC-DC converter MOB may further include a counter CN accumulating/adding one or more values of the second comparison signal CMPO2 to generate a protection activation signal PCLEN. The selector MUX includes a first input terminal 0 receiving the first protection level PCLLEVEL1, a second input terminal 1 receiving the second protection level PCLLEVEL2 and a control input terminal S receiving the protection activation signal PCLEN from the counter CN.

The second DC-DC converter MOB may further include an updown counter UDCN generating an increase-or-decrease signal based on the first comparison signal CMPO1 and the protection activation signal PCLEN and outputting the increase-or-decrease signal to the reference voltage controller VREFCON.

The reference voltage controller VREFCON may generate the second reference voltage VREF2 based on the first reference voltage VREF1, the increase-or-decrease signal, and the protection activation signal PCLEN.

The reference voltage controller VREFCON operates in a digital mode so that the reference voltage controller VREFCON may increase or decrease the second reference voltage VREF2 by a predetermined amount according to the increase-or-decrease signal.

According to embodiments, the DC-DC converter 520 and 540B may change the level of the output voltage ELVDD or ELVSS without blocking the output voltages ELVDD and ELVSS if the output voltage ELVDD is ELVSS abnormal. Therefore, the DC-DC converter 520 and 540B may stably output the output voltages ELVDD and ELVSS. Thus, the DC-DC converter 520 and 540B may not be shut down, and the display panel 100 may continue to operate. If the display panel is part of an automotive apparatus, the safety of a user of the automotive apparatus may be protected.

The foregoing is illustrative and is not to be construed as limiting. Although a few example embodiments have been described, many modifications are possible in the example embodiments. All such modifications are within the scope defined in the claims. In the claims, means-plus-function clauses are intended to cover the structures described herein as performing the recited function and not only structural equivalents but also equivalent structures.

What is claimed is:

1. A DC-DC converter comprising:
a sensor configured to receive an output voltage to generate a sensed signal;
a determiner electrically connected to the sensor and configured to determine a difference between the sensed signal and a first protection level for generating a determiner output;
a reference voltage controller electrically connected to the determiner and configured to generate a second reference voltage based on a first reference voltage and a value of the determiner output; and
an output voltage controller electrically connected to the sensor and configured to output the output voltage based on an input voltage, a feedback voltage of the output voltage, and the second reference voltage.

2. The DC-DC converter of claim 1, wherein when the sensed signal maintains equal to or greater than the first protection level for a time length that exceeds first predetermined time duration, a protection mode of the DC-DC converter is activated.

3. The DC-DC converter of claim 2, wherein when the protection mode is activated, the reference voltage controller generates the second reference voltage such that the sensed signal is equal to or less than the first protection level.

4. The DC-DC converter of claim 3, wherein when the sensed signal maintains equal to or less than the second protection level for a time period that exceeds the first predetermined time duration in the protection mode of the DC-DC converter, the protection mode of the DC-DC converter is deactivated.

5. The DC-DC converter of claim 3, wherein when the protection mode of the DC-DC converter maintains equal to or longer than second predetermined time duration, a level of the output voltage is changed to a predetermined forced level, and the protection mode of the DC-DC converter is deactivated.

6. The DC-DC converter of claim 1, wherein the determiner is an amplifier configured to amplify the difference between the sensed signal and the first protection level to generate an amplified signal and configured to output the amplified signal as the determiner output to the reference voltage controller.

7. The DC-DC converter of claim 6, further comprising:
a comparator electrically connected to the sensor and configured to compare the sensed signal with the first protection level representing activation of a protection mode or a second protection level representing deactivation of the protection mode to generate a comparison signal; and
a counter electrically connected to the comparator and configured to accumulate one or more values corresponding to the comparison signal to generate a protection activation signal.

8. The DC-DC converter of claim 7, further comprising a selector electrically connected to the comparator and configured to output one of the first protection level and the second protection level to the comparator.

9. The DC-DC converter of claim 8, wherein the first protection level is greater than the second protection level.

10. The DC-DC converter of claim 1, wherein the determiner is a first comparator configured to compare the sensed signal with the first protection level to generate a first comparison signal.

11. The DC-DC converter of claim 10, further comprising:
a second comparator electrically connected to the sensor and configured to compare the sensed signal with the first protection level representing activation of a protection mode or a second protection level representing deactivation of the protection mode to generate a second comparison signal; and
a first counter electrically connected to the second comparator and configured to accumulate one or more values corresponding to the second comparison signal to generate a protection activation signal.

12. The DC-DC converter of claim 11, wherein the reference voltage controller comprises an updown counter electrically connected to the first counter, configured to generate an increase-or-decrease signal based on the first comparison signal and the protection activation signal, and configured to output the increase-or-decrease signal to the reference voltage controller, and
wherein the reference voltage controller is configured to generate the second reference voltage based on the first reference voltage, the increase-or-decrease signal, and the protection activation signal.

13. A method of DC-DC converting using a DC-DC converter, the method comprising:
receiving, using a sensor of the DC-DC converter, an output voltage to generate a sensed signal;
determining, using a determiner of the DC-DC converter electrically connected to the sensor of the DC-DC converter, a difference between the sensed signal and a first protection level for generating a determiner output;
generating, using a reference voltage controller of the DC-DC converter electrically connected to the determiner of the DC-DC converter, a second reference voltage based on a first reference voltage and a value of the determiner output; and
outputting, using an output voltage controller of the DC-DC converter electrically connected to the sensor of the DC-DC converter, the output voltage based on an input voltage, a feedback voltage of the output voltage, and the second reference voltage.

14. The method of claim 13, wherein when the sensed signal maintains equal to or greater than the first protection level for a time length that exceeds first predetermined time duration, a protection mode of the DC-DC converter is activated.

15. The method of claim 14, wherein when the protection mode of the DC-DC converter is activated, the second reference voltage is generated such that the sensed signal is equal to or less than the first protection level.

16. The method of claim 15, wherein when the sensed signal maintains equal to or less than the second protection level for a time period that exceeds the first predetermined time duration in the protection mode of the DC-DC converter, the protection mode of the DC-DC converter is deactivated.

17. The method of claim 15, wherein when the protection mode maintains equal to or longer than a second predetermined time duration, a level of the output voltage is changed to a predetermined forced level, and the protection mode of the DC-DC converter is deactivated.

18. A display apparatus comprising:
a display panel comprising scan lines, data lines, and pixels electrically connected to the scan lines and the data lines;
a scan driver configured to output scan signals to the scan lines;
a data driver configured to output data voltages to the data lines; and
a power generator comprising a DC-DC converter and configured to provide a first power voltage and a second power voltage less than the first power voltage to the display panel,
wherein the DC-DC converter comprises:
a sensor configured to receive an output voltage to generate a sensed signal;
a determiner electrically connected to the sensor and configured to determine a difference between the sensed signal and a first protection level for generating a determiner output;
a reference voltage controller electrically connected to the determiner and configured to generate a second reference voltage based on a first reference voltage and a value of the determiner output; and an output voltage controller electrically connected to the sensor and configured to output the output voltage based on an input voltage, a feedback voltage of the output voltage, and the second reference voltage.

19. The display apparatus of claim 18, wherein the output voltage is the first power voltage, and
wherein the DC-DC converter is configured to decrease a level of the first power voltage when a protection mode of the DC-DC converter is activated.

20. The display apparatus of claim 18, wherein the output voltage is the second power voltage, and
wherein the DC-DC converter is configured to increase a level of the second power voltage when a protection mode of the DC-DC converter is activated.

* * * * *